Patented Oct. 31, 1933

1,932,648

UNITED STATES PATENT OFFICE 1,932,648

ASPHALT EMULSION

Kenneth Taylor, Whiting, Ind., assignor to Standard Oil Company, Chicago, Ill., a corporation of Indiana No Drawing. Application December 19, 1930
Serial No. 503,492

2 Claims. (Cl. 134—1)

This invention relates to bituminous emulsions and it pertains more particularly to emulsions of petroleum asphalts.

The object of this invention is to provide, at a minimum cost, a fluid, aqueous asphalt emulsion which may be diluted with hard water without separating out.

A further object is to provide an emulsion which, when applied to a surface, will coalesce thereto and form a uniform hard layer of asphalt which cannot be readily dislodged therefrom or reemulsified by the application of water.

A further object is to provide an emulsion which has no tendency to form a scum or skin on its surface.

A further object is to provide an emulsion that is not adversely affected by freezing or by changes in temperature, that will flow in cold weather, and will not separate or "break" in either extremely cold or hot weather.

A further object is to provide an asphalt emulsion that can be used for the widely varying purposes which have heretofore required separate types of emulsions,—in other words, to provide an emulsion which may be used as a highway building material, paint, water proofing material, flooring material, protective coating material, etc.

I have discovered that when mixtures of certain emulsifying agents are used to emulsify asphalt the result cannot be predicated on the results obtained by the use of these agents separately. More specifically I have discovered that while starch, protein, soda rosin soap, green acid soap, saponified oleic acid, etc. may be used separately as emulsifiers, none of the emulsions heretofore produced by these agents have satisfactorily met the rigid requirements of the various industries. When certain of these agents are mixed and/or used together in the manner hereinafter described, they apparently do not act as separate entities, but each agent exerts an influence over the effect produced by every other agent. My invention contemplates the use of mixtures including farinaceous protein material, and/or green acid soap in the manners and proportions hereinafter set forth.

I have produced an excellent emulsion by the use of green acid soap with a protein emulsifier or a fatty acid soap emulsifier. The protein may be corn gluten meal or soybean meal and it may constitute about 1.6% of the finished emulsion. The green acid soap preferably constitutes about 0.2 to 0.8 of the finished emulsion.

The invention will be better understood from the detailed description which follows.

An example of my protein emulsifier formula is as follows:

| | Percent |
|---|---|
| Asphalt | 64.05 |
| Water | 35.00 |
| Caustic soda | .08 |
| Corn gluten (or soy bean) meal | .64 |
| Green acid soap | 0.23 |

The asphalt for use in this formula may be produced from Mid-Continent petroleum; it may have a melting point of about 110° F., and a penetration of about 130 at 77° F. My formula may be readily adapted to other asphalts, however, the proportions of emulsifying agents being slightly increased for asphalts of increased melting points.

Green acid soap is a composition of preferentially water soluble sulfonic salts. This soap may be prepared by the neutralization of green acids, which are well known in the petroleum industry and which are described in the United States patent to Humphreys et al. No. 1,474,933. Green acid soap is used in refineries for breaking emulsions and a "spent G. A. soap" which results from this use may also be employed in my invention. If the green acid soap contains appreciable amounts of oil, a harder asphalt should be emulsified, to produce a residue of given penetration, than is necessary when the green acid soap is free from oil. The term "green acid soap" as used herein includes concentrated soap, spent soap, soap containing oil and other forms in which this substance is available. In the formula the percent of green acid soap is on the dry soap basis. Caustic soda is included to increase the alkalinity of the composition and may obviously be substituted by equivalent alkaline salts. In some cases it may be omitted altogether.

The farinaceous protein emulsifier is preferably corn gluten meal or soybean meal, both of which contain about 40% protein and about 40% carbohydrates with 1-4% of fat and 4-7% fiber. Starch has some effect as an emulsifier but protein is decidedly superior thereto and is the active principle of the farinaceous emulsifier.

The corn gluten meal may react chemically with the caustic prior to or during emulsification. The exact nature of this reaction has not been determined. I have found, however, that a small amount of caustic soda in the formula is highly desirable in obtaining an emulsion of desired properties.

In preparing the emulsion the procedure is as follows: The caustic, farinaceous emulsifier, and green acid soap are mixed with the water and heated to a temperature of about 200° F. This hot solution or mixture is placed in a suitable stirrer, agitator or mixer and is beaten by paddles, circulated by centrifugal pumps or dispersed between suitable rotors moving at high velocities. The apparatus per se forms no part of my present invention and it will not be described in detail.

The melted asphalt at about the same temperature is slowly stirred into the solution and further agitated until complete emulsification has taken place. When high melting point asphalts are used it may be necessary to increase the temperature at which the asphalt is added, but it is desirable to keep the temperature of the emulsion below the boiling point of water so that the foaming due to the production of steam may be prevented.

I have discovered that the farinaceous protein emulsifier may be used with other soaps, such as soda rosin soap and the soaps prepared by the neutralization of fatty acids. For instance, I may use the following formula:

| | Percent |
|---|---|
| Water | 32.000 |
| Asphalt | 67.065 |
| Farinaceous protein meal | 0.652 |
| Soda rosin soap | 0.221 |
| Sodium hydroxide | 0.062 |

I have also discovered that other emulsifiers, such as rosin soaps, fatty acid soaps, etc. may be combined with green acid soaps to produce emulsions which are markedly superior to those heretofore known. For example, I may use the following formula:

| | Percent |
|---|---|
| Asphalt | 66.2 |
| Water | 33.00 |
| Green acid soap | .60 |
| Soda rosin soap | .20 |

In this case the soaps will be mixed in the aqueous solution, heated and placed in the stirrer and the melted asphalt will be poured into the hot solution substantially as above described.

The small percentages of green acid soap not only exert a beneficial influence on the emulsification of oils but they alter the action of protein or soap emulsifiers and the combination produces altogether new results. The finished product is not broken by dilution with hard waters, it can be subjected to temperatures from below freezing to boiling without separation of the phases, no scum or skin is formed at the surface of the emulsion and it may be used for a variety of purposes which have heretofore required altogether different products.

If a mixture of farinaceous protein and water is allowed to stand for a few days in a warm place putrefaction will take place. In my formulæ the green acid soap apparently acts as a preservative because the putrifaction is prevented thereby and my emulsions remain stable and sweet for indefinite periods of time.

The problem of dilution merits further comment. Heretofore asphalt emulsions have been "broken" by the addition of hard water containing 20 grains per gallon (calcium carbonate). I may dilute my emulsion with water containing the equivalent of 300 grains per gallon without impairing the emulsion.

An important feature of the invention is the decrease in cost which is accomplished by the particular formulæ proposed. The cost of the emulsifier in my formulæ is from one-fifth to one-fiftieth of the cost of emulsifiers heretofore used to obtain equivalent results. This marked decrease in the cost of production is of great importance, particularly when the cost of the emulsifying agent forms a considerable part of the cost of the finished emulsion.

In the above description I have described the emulsification of asphalt, but it is understood that the invention is applicable to equivalent bituminous materials. If hard high melting point bitumens are to be emulsified, the amount of emulsifying agent must be slightly increased and in some instances it may be double the amount specified in the above examples. The proportions, rates of stirring, etc. will also vary with the bitumen that is to be emulsified, as will be apparent to those skilled in the art.

While I have disclosed preferred embodiments of the invention it is understood that I do not limit myself to the details herein set forth except as defined by the following claims.

I claim:

1. A stable fluid concentrated aqueous asphalt emulsion which may be diluted with hard water without separating out and which may be subjected to extreme temperature conditions without breaking, which emulsion comprises asphalt dispersed in a small amount of water by means of an emulsifier, one ingredient of which is a farinaceous protein material and another ingredient of which is green acid soap.

2. A concentrated stable aqueous asphalt emulsion which may be diluted with hard water without breaking, which emulsion comprises about two parts of asphalt dispersed in one part of water by means of an alkaline mixture of a farinaceous protein emulsifier in combination with a green acid soap.

KENNETH TAYLOR.